United States Patent [19]

Good

[11] 4,223,463

[45] Sep. 23, 1980

[54] RECORDING TAPE CARRIER

[75] Inventor: David M. Good, Rochester, N.Y.

[73] Assignee: Tapecon, Inc., Rochester, N.Y.

[21] Appl. No.: 940,885

[22] Filed: Sep. 11, 1978

[51] Int. Cl.$^2$ .................... G09F 1/10; G09F 27/00; G09B 5/04

[52] U.S. Cl. .................... 40/158 R; 35/35 C; 353/120; 428/40; 428/900

[58] Field of Search .................... 360/2, 134; 353/15, 353/19, 120; 35/35 C; 428/40, 41, 900; 40/156, 158 R; 235/493

[56] References Cited

U.S. PATENT DOCUMENTS

| | | | |
|---|---|---|---|
| 3,594,076 | 7/1971 | Licitis et al. | 353/120 X |
| 3,807,851 | 4/1974 | Knox et al. | 360/2 X |
| 4,090,003 | 5/1978 | Pierson | 428/42 |

Primary Examiner—George F. Lesmes
Assistant Examiner—Alexander S. Thomas
Attorney, Agent, or Firm—Stonebraker, Shepard & Stephens

[57] ABSTRACT

A recording tape carrier is attachable to a card or photograph and carries a magnetic recording tape that is usable in the recording slot of a magnetic recorder. A support card has a linear reference edge, and an abutment card is secured to a face surface of the support card to have an abutment edge extending along a mid-region of the support card and parallel with the reference edge. Adhesive covered by a release sheet is coated on the face surface of the support card in a region not occupied by the abutment card, and a strip of magnetic recording tape is secured to the support card or the abutment card to extend parallel with the reference edge. The release sheet is removable for securing the assembly to a card or photograph by means of the adhesive with the abutment edge engaging an edge of the card or photograph, and the magnetic tape is prerecordable and can be played back or recorded while secured to a card or photograph.

10 Claims, 4 Drawing Figures

RECORDING TAPE CARRIER

BACKGROUND OF THE INVENTION

U.S. Pat. No. 4,090,003 suggests a recording tape applicator that can be used for accurately securing a strip of magnetic recording tape along a bottom edge of a card or photograph so that the recording strip is accurately spaced from and parallel with the edge for recording and playing back in the recording slot of a magnetic recorder. With such an arrangement, the recording tape must be secured permanently to a card or photograph before it can be recorded. Especially relative to photographs, this means that sound recorded on the magnetic strip is limited to sound made after the photographic print is completed.

There is a need for a sound recording strip that can be recorded separately from the card or photograph on which it is eventually mounted so that sound recordings can be made simply and conveniently whenever the desired sound occurs, and the recorded sound can be matched with whatever card or photograph is desired. This invention provides a magnetic sound strip on a carrier that allows recording on the strip before it is permanently mounted and also facilitates easy use and mounting. The invention aims at an inexpensive, convenient, and compact carrier for magnetic recording tapes that are later mountable on a card or photograph.

SUMMARY OF THE INVENTION

The inventive recording tape applicator is attachable to a card or photograph and usable in a recording slot of a magnetic recorder. It includes a support card having a linear reference edge and an abutment card secured to a face surface of the support card to form an assembly. The abutment card has an abutment edge extending along a mid-region of the support card and parallel with the reference edge. Adhesive covers a face surface of the support card in a region not occupied by the abutment card, and the adhesive is covered by a release sheet. A strip of magnetic recording tape is secured to the assembly to extend parallel with the reference edge and have a perdetermined spacing from the reference edge, and the release sheet is removable for securing the assembly to a card or photograph by means of the adhesive with the abutment edge engaging an edge of the card or photograph.

DRAWINGS

DETAILED DESCRIPTION

Figure 1:
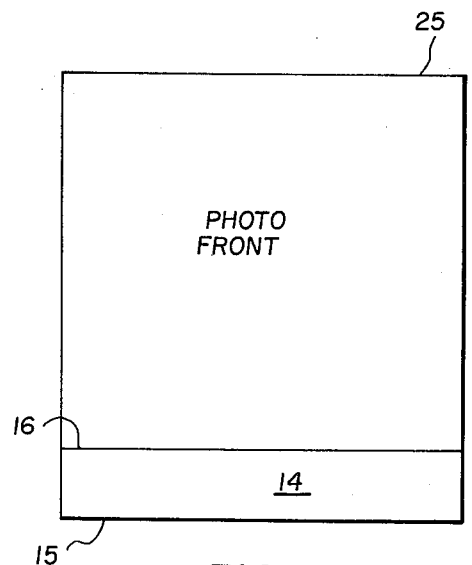
FIG. 1 is a front elevational view of one preferred embodiment of the inventive carrier mounted on a photograph.
Figure 2:
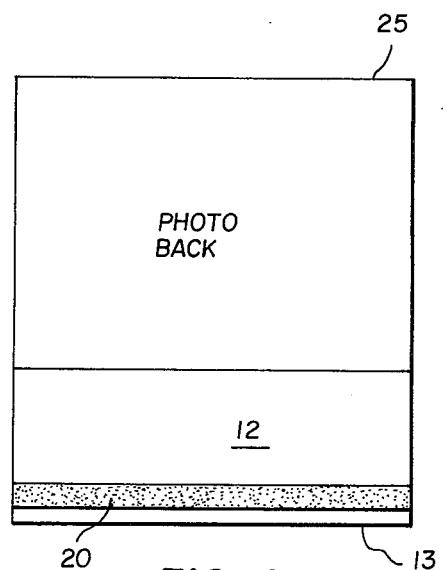
FIG. 2 is a rear elevational view of the embodiment of FIG. 1.
Figure 3:
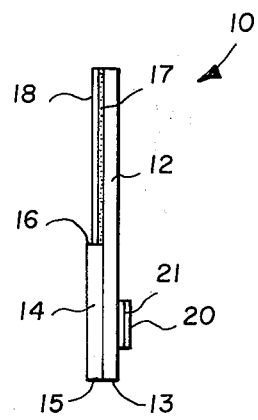
FIGS. 3 and 4 are enlarged, and elevational views of two preferred embodiments of the inventive carrier.

Carrier 10 as shown in FIG. 3 includes a support card 12 preferably formed of stiff card stock for reasonable strength. Card 12 has a linear reference edge 13 extending along its bottom edge for guiding in the slot of a slot type magnetic recorder that can record and play back from magnetic tape strips on flat cards, photographs, or other generally plane elements. An abutment card 14 is secured to a face surface of support card 12 and has a longitudinal edge 15 extending along a reference edge 13. Registry of edges 15 and 13 is preferred but not required. The opposite edge 16 of abutment card 14 is preferably linear and extends along a mid-region of support card 12 parallel with reference edge 13 and serves as an abutment edge for accurately positioning carrier 10 against an edge of a card or photograph as best shown in FIGS. 1 and 2. The face surface of support card 12 above abutment edge 16 is coated with an adhesive layer 17 covered by a release sheet 18. Adhesive 17 is preferably pressure sensitive for securing the face surface of support card 12 to a surface of a card or photograph on which element 10 is mounted, again as shown in FIGS. 1 and 2.

Figure 4:
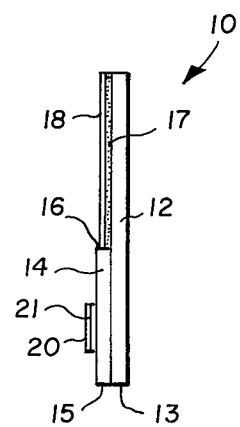

A magnetic recording strip 20 is secured to support card 12 by adhesive 21 to extend along reference edge 13 and be accurately spaced from and parallel with reference edge 13. Magnetic tape 20 is secured to a face surface of support card 12 opposite abutment card 14 in the embodiment of FIG. 3 and is secured to a face surface of abutment card 14 in the embodiment of FIG. 4. The placement of magnetic strip 20 depends on the orientation of the recording head in the magnetic recorder for which the carrier is intended, so that the operator can view a card or photograph to which the inventive carrier is secured while the magnetic recorder records or plays back from magnetic strip 20.

The carrier is mounted on a card or photograph as shown in FIGS. 1 and 2 after removal of release sheet 18. Abutment edge 16 is positioned closely against the bottom edge of a card or photograph 25, and adhesive coating 17 is pressed against a back surface of the card or photograph to secure the carrier in place. Abutment card 14 then extends below the bottom edge of card or photograph 25, and support card 12 overlaps the back of a card or photograph and also extends below the bottom edge. Reference edge 13 guides the carrier through the recording slot of a magnetic recorder for recording or playing back sounds from magnetic strip 20.

In operation, the inventive carrier can be used to make a sound recording before the carrier is mounted on a card or photograph, and it is conveniently small and assembled on a relatively stiff support card 12 so that it can be readily carried in a pocket and reliably driven through a recording slot. It is not too large or too limp, does not blow in the wind, does not take up much space, and is very easy to use. A carrier according to the invention is especially convenient for taking to a scene to be photographed for making recordings of sounds that occur at the scene at the time the photographs are made. Separate recording strips for this purpose are especially convenient and do not require premounting or preassociation with any particular photograph. When photographic prints are completed, carriers with sounds recorded from the scenes where the photographs were made can easily be secured to their respective photographs by removing release sheets and pressing the carriers in place along the bottom edges of the photos. Support cards 12 are stiff enough to support photos or cards in an upright position while recording strips 20 are driven through magnetic recorders for recording or playback, and recorded carriers according to the invention are easily mounted permanently on cards or photographs for this purpose. They enlarge the size of a card or photograph only slightly when mounted in place, and they afford an easy way for permanently associating recorded sound with a still photograph. Also, by positioning recording strip 20 below the bottom edge of a card or photograph, carrier 10 avoids sound distortion from any irregularity in surface smoothness of a card or photograph.

Recording tape carriers according to the invention can also be used for recording all sorts of sounds and can be attached to any card-shaped device. They can be mounted on greeting cards, postcards, and many other devices for recording messages or other sounds.

I claim:

1. A magnetic recording tape carrier attachable to a card or photograph and usable in a recording slot of a magnetic recorder both before and after attachment to a card or photograph, said carrier comprising:
    a. a plane support card rectangular in cross section and having a bottom edge formed as a linear reference edge for guiding said carrier in moving through said recording slot;
    b. a plane abutment card rectangular in cross section and secured to a face surface of said support card adjacent to said bottom reference edge to form an assembly;
    c. said abutment card extending from the region of said bottom reference edge of said support card vertically upward to a mid-region of said support card to cover a lower region of said support card;
    d. said abutment card having a longitudinal abutment edge extending along said mid-region of said support card and parallel with said bottom reference edge for engaging a bottom edge of said card or photograph and locating said carrier relative to said card or photograph;
    e. adhesive on said face surface of said support card in a region not occupied by said abutment card for securing said carrier to a face surface of said card or photograph in a region adjacent to said bottom edge of said card or photograph;
    f. a release sheet covering said adhesive;
    g. a strip of magnetic recording tape secured to said assembly between said reference edge and said abutment edge to extend parallel with said reference edge and have a predetermined spacing from said reference edge, said magnetic recording tape being disposed below said bottom edge of said card or photograph when said carrier is attached to said card or said photograph; and
    h. said release sheet being removable for securing said assembly to said card or photograph by means of said adhesive with said abutment edge engaging said bottom edge of said card or photograph.

2. The carrier of claim 1 wherein said magnetic recording tape is secured to a face surface of said support card opposite said abutment card.

3. The carrier of claim 1 wherein said magnetic recording tape is secured to a face surface of said abutment card.

4. The carrier of claim 1 wherein said abutment edge of said abutment card is linear.

5. The carrier of claim 1 wherein another longitudinal edge of said abutment card extends along and registers with said reference edge.

6. The carrier of claim 1 wherein said adhesive covers all of said face surface of said support card not occupied by said abutment card.

7. The carrier of claim 6 wherein said abutment edge of said abutment card is linear.

8. The carrier of claim 7 wherein another longitudinal edge of said abutment card extends along and registers with said reference edge.

9. The carrier of claim 8 wherein said magnetic recording tape is secured to a face surface of said support card opposite said abutment card.

10. The carrier of claim 8 wherein said magnetic recording tape is secured to a face surface of said abutment card.